(No Model.)  3 Sheets—Sheet 1.

J. FLINDALL.
Car Brake.

No. 240,683.  Patented April 26, 1881.

Witnesses
Inventor
John Flindall
Per: Harry Harrison
Attorney.

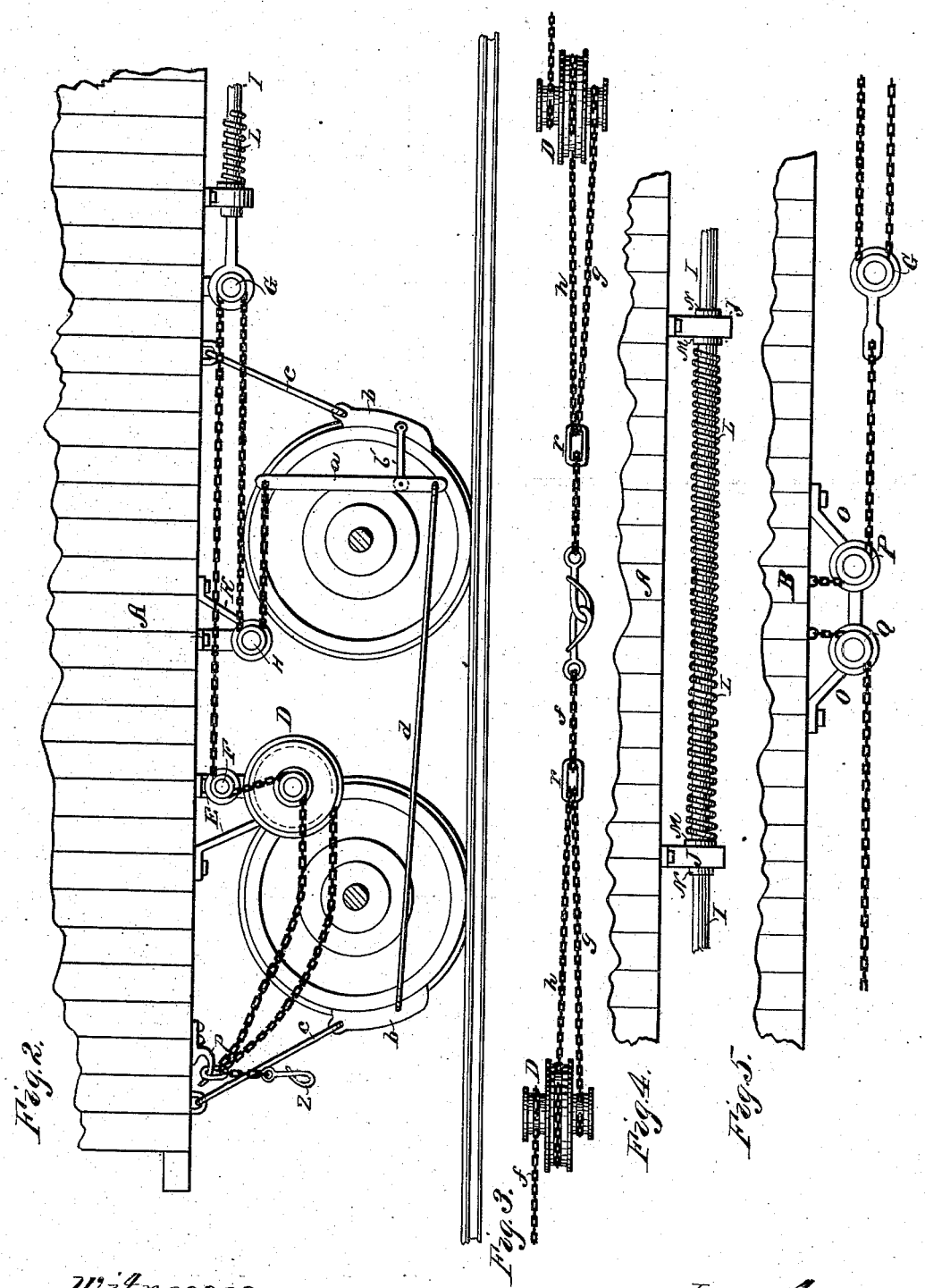

(No Model.)

3 Sheets—Sheet 3.

J. FLINDALL.
Car Brake.

No. 240,683.  Patented April 26, 1881.

Witnesses.
Henry Frankfurter.
Frank Johnson.

Inventor.
John Flindall
per. Harry Harrison
Attorney.

N. PETERS, PHOTO-LITHOGRAPHER, WASHINGTON, D.C.

UNITED STATES PATENT OFFICE.

JOHN FLINDALL, OF CHICAGO, ILLINOIS.

CAR-BRAKE.

SPECIFICATION forming part of Letters Patent No. 240,683, dated April 26, 1881.

Application filed February 21, 1881. (No model.)

*To all whom it may concern:*

Be it known that I, JOHN FLINDALL, a subject of the Queen of Great Britain, residing at Chicago, in the county of Cook and State of Illinois, have invented certain new and useful Improvements in Railroad-Car Brakes, of which the following is a specification, reference being had to the accompanying drawings, in which—

Figure 1:
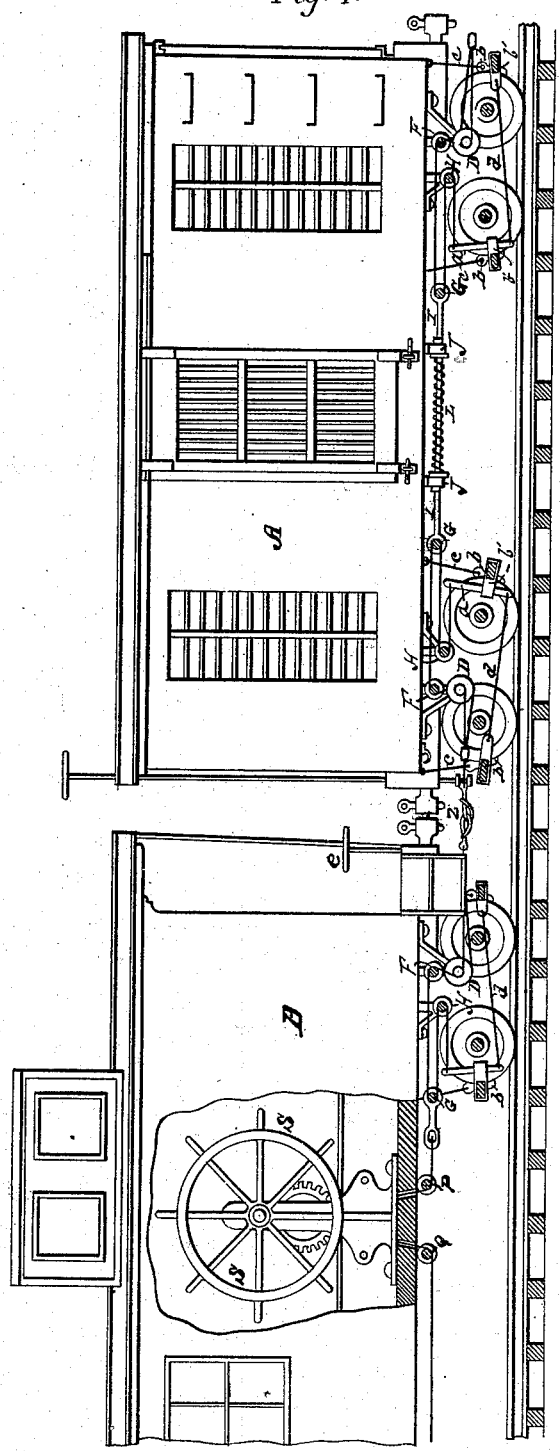
Figure 6:
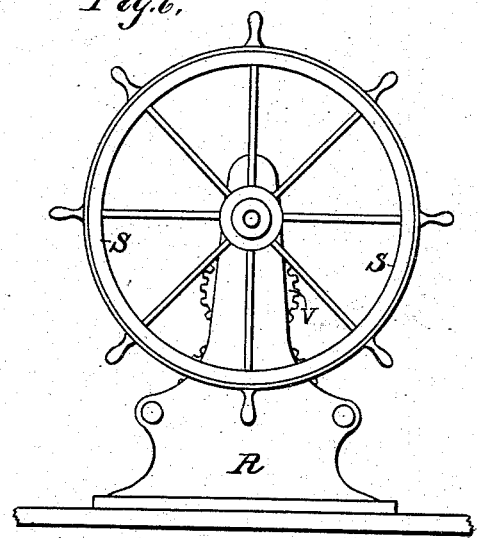
Figure 7:
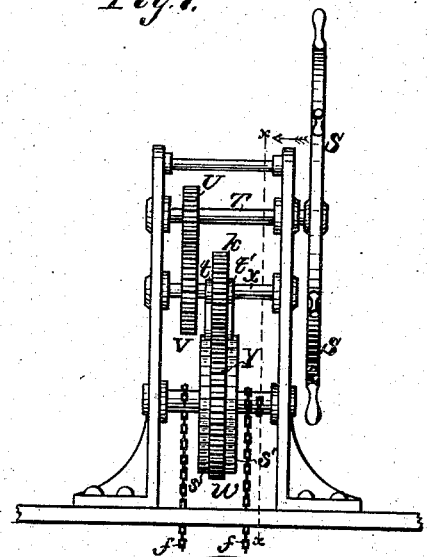
Figure 8:
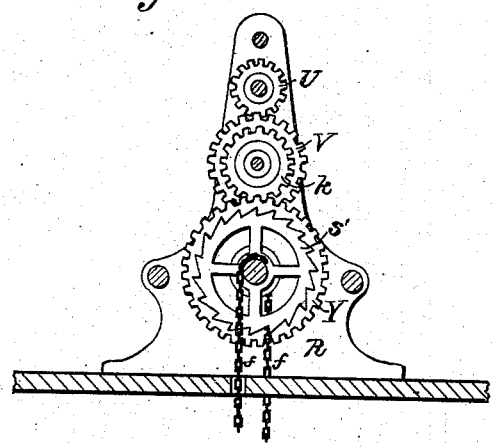
Figure 9:
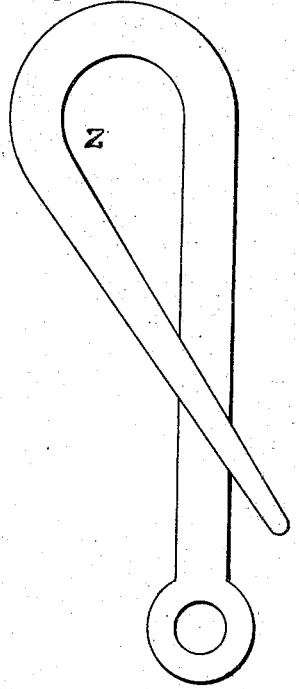

Figure 1 is a view of caboose with freight-car attached, showing my improved brake appliances. Fig. 2 is an enlarged view of one end of freight-car provided with my improved brake. Fig. 3 is a view showing the connection of the triple drum and chain. Fig. 4 shows the construction and operation of the spring and connections. Fig. 5 shows the connection of the chain with the operating car. Fig. 6 is a front view of the device for operating the brakes. Fig. 7 is a side view of the operating device, showing the chains attached ready for use. Fig. 8 is a section on the line $x\,x$ of Fig. 7, and Fig. 9 is a view of the hook connecting the brake-chain of each car.

Like letters indicate like parts throughout the several views.

A is a freight-car provided with the ordinary trucks and running-gear, and B is a caboose.

The brake-shoes $b\,b$, which are supported and held in position by the links $c\,c$, are connected, by pivoted bars $b'\,b'$ and rods $d\,d$, with the brake-levers $a\,a$.

A triple drum, D, composed of a large central drum, with a smaller one on each side, and all made in one piece, as shown in Fig. 3, is supported in a suitable frame, E, that is secured to the bottom of the cars A and B.

The frame E extends down sufficiently to bring the drum D to a position in the center of the car, below the coupling, so as to allow the chain to work freely.

A pulley, F, is secured to one of the arms of the frame E, in such a position above the drum D as to convey the chain therefrom to the pulley G, which is attached to one end of a chain, or, preferably, a spring-rod, I, that is supported beneath the car in suitable loops or brackets, J, and provided with a coiled spring, L.

The spring-rod I conveys the motion to a pulley, H, supported in a frame or bracket, K, that is attached to the car in a similar manner with the frame E. The bracket K extends downward, so as to bring the pulley H in such a position that the operating-chain, passing from the pulley F through pulley G to the pulley H, may have free motion when applied and attached to the upper end of the lever $a$.

M M are washers that are placed loosely on the rod I, and are of such size that they will not pass through the openings in the supports J J, against which they have a bearing. These washers allow the rod I to move freely, but yet fit it sufficiently close to prevent the shoulders N N from passing through them.

A pulley-frame, O, is secured beneath the caboose B, for supporting the pulleys P Q.

In the caboose or car B are the operating devices, which consist of a frame, R, supporting the wheel S, which is rigidly attached to and revolves the shaft T. This shaft carries a small cog-wheel, U, that gears with a similar wheel, V, on the shaft X. The shaft X carries a pinion, $k$, that meshes with a toothed wheel, Y, on the drum W, which is also provided with ratchets $s\,s'$, that engage with pawls $t\,t'$ on the shaft X and hold the mechanism at rest, except when operated by the wheel S.

The chains or wire ropes $f$ are secured at one end to the drum W, and extend the entire length of the train, being connected between the cars by means of the hooks $z$, (shown in Fig. 9,) and by the chains $g\,h$, which are parts of the chain $f$.

The chains $g$ and $h$ are connected with the triple drum D, and are employed for the purpose of taking up the slack. They are connected at one end to a ring, $r$, and at the other to the triple drum D, the chain $h$ being attached to the larger part of the drum and the chains $g$ and $f$ to the smaller parts.

$e$ is a hand-wheel for operating the brakes in the ordinary manner.

$p$ is a hook attached under the center of the end of each car, for hooking up the ring $r$ when the brake is not in use or the car detached.

The operation of the devices is as follows: When a train of cars to which the devices are applied in proper position is in motion, if the wheel S is turned in the direction in which the cars are moving, one of the chains $f$ will be wound around the drum W, and the chain that passes in the opposite direction, not being in use, becomes slack. As the chain in use winds upon the drum W it will be drawn through the several pulleys, tightening the brake and causing the rod I to move along. The movement of the rod I causes its shoulder N at one end to pass through the brackets or supports J and press against the washer M, which compresses the spring L against the opposite washer, M, and causes the latter washer to bear firmly against the side of its support J, when the brakes will be instantly applied throughout the train and the speed of the train lessened. When the brakes have been applied sufficiently the pawls $t\ t'$ are allowed to engage with the ratchets $s\ s'$, thus holding the brakes firmly.

The slack of the chain beneath each car is taken up by means of the triple drum D, which is turned by the chain $f$.

In order to release the brakes the operator raises the pawls $t\ t'$ and turns the wheel S in the opposite direction, when the chains $f$, $g$, and $h$ will unwind, and the strain or pressure having been taken from the spring L, the said spring will move back to its normal position, carrying or moving back the rod I, and the brake-shoes will be lifted from off the wheels.

If the coupling of the bumpers of any of the cars should become detached, so that the train is broken, the hooks $z$, being attached, will hold the chains firm, and the pull on the chains will apply the brakes.

When the cars are being switched about in the yard the brakes can be operated by the hand-wheel $e$, in the ordinary manner. When the cars are uncoupled the chains are detached and hung upon the hooks $p$, by means of the rings $r$, until required for use.

Having thus described my invention, what I claim as new, and desire to secure by Letters Patent, is—

1. The wheel S, gears U V $k$ Y, and drum W, journaled in the frame R, in combination with the chain $f$, for operating the brakes, substantially as specified.

2. The detachable chain $f$, provided with hooks $z$, in combination with the drum W and triple drum D, substantially as set forth.

3. The triple drum D, with connecting-chains $g\ h$, in combination with the rings $r$ and chains $f$, substantially as shown and described.

4. The combination of the triple drum D, pulleys F G H, lever $a$, and connecting-chains $f\ g\ h$, substantially as specified.

5. The rod I, provided with shoulders N N, washers M M, and spring L, in combination with the brackets J J and chain $f$, substantially as and for the purpose set forth.

JOHN FLINDALL.

Witnesses:
FRANK JOHNSON,
J. TAYLOR HAIR.